June 25, 1929.  E. A. DILLON  1,718,810
AUTOMOBILE TURN TABLE
Original Filed Nov. 26, 1926   3 Sheets-Sheet 1

June 25, 1929.   E. A. DILLON   1,718,810
AUTOMOBILE TURN TABLE
Original Filed Nov. 26, 1926   3 Sheets-Sheet 2

E. A. Dillon
INVENTOR
BY Victor J. Evans
ATTORNEY

June 25, 1929.  E. A. DILLON  1,718,810
AUTOMOBILE TURN TABLE
Original Filed Nov. 26, 1926  3 Sheets-Sheet 3
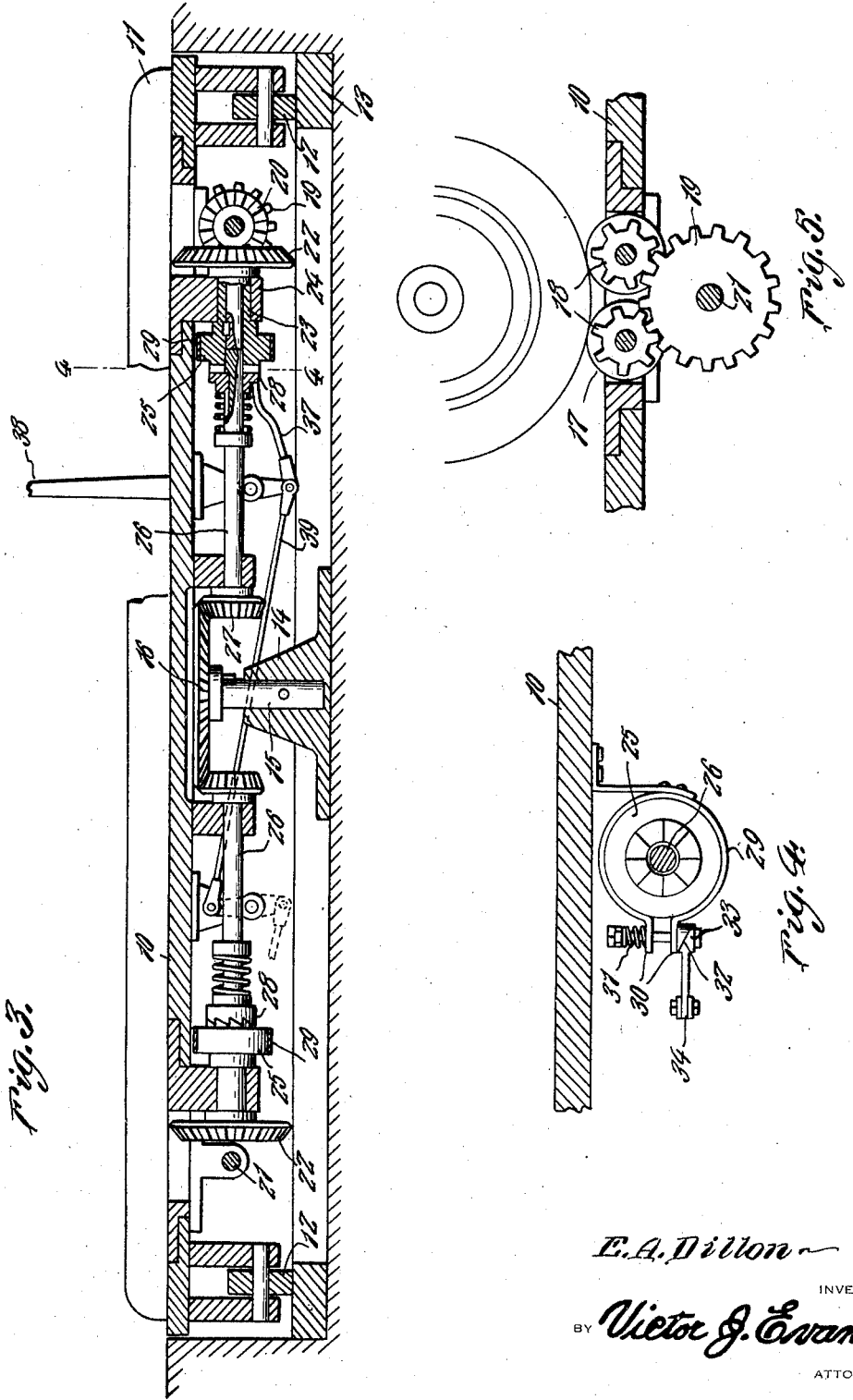

Patented June 25, 1929.

1,718,810

UNITED STATES PATENT OFFICE.

EARL A. DILLON, OF SAN ANTONIO, TEXAS.

AUTOMOBILE TURNTABLE.

Application filed November 26, 1926, Serial No. 150,926. Renewed November 19, 1928.

This invention relates to turn tables, stationary or movable, or other devices primarily applicable for reversing the position or changing the direction of a motor driven vehicle.

Another object of the invention contemplates an operating means included with the turn table adapted to be driven by power derived from the vehicle.

A further object comprehends a brake mechanism for checking the rotation of the table in a desired position to permit the vehicle to traverse the same when leaving the garage.

With the above and other objects in view, the invention further consists of the following novel features and details of construction, to be hereinafter more fully described, illustrated in the accompanying drawings, and pointed out in the appended claim.

In the drawings:

Figure 3 is a sectional view taken on line 3—3 of Figure 1.

Figure 4 is a sectional view taken on line 4—4 of Figure 3.

Figure 5 is a transverse section taken through a portion of the operating mechanism.

Figure 1:
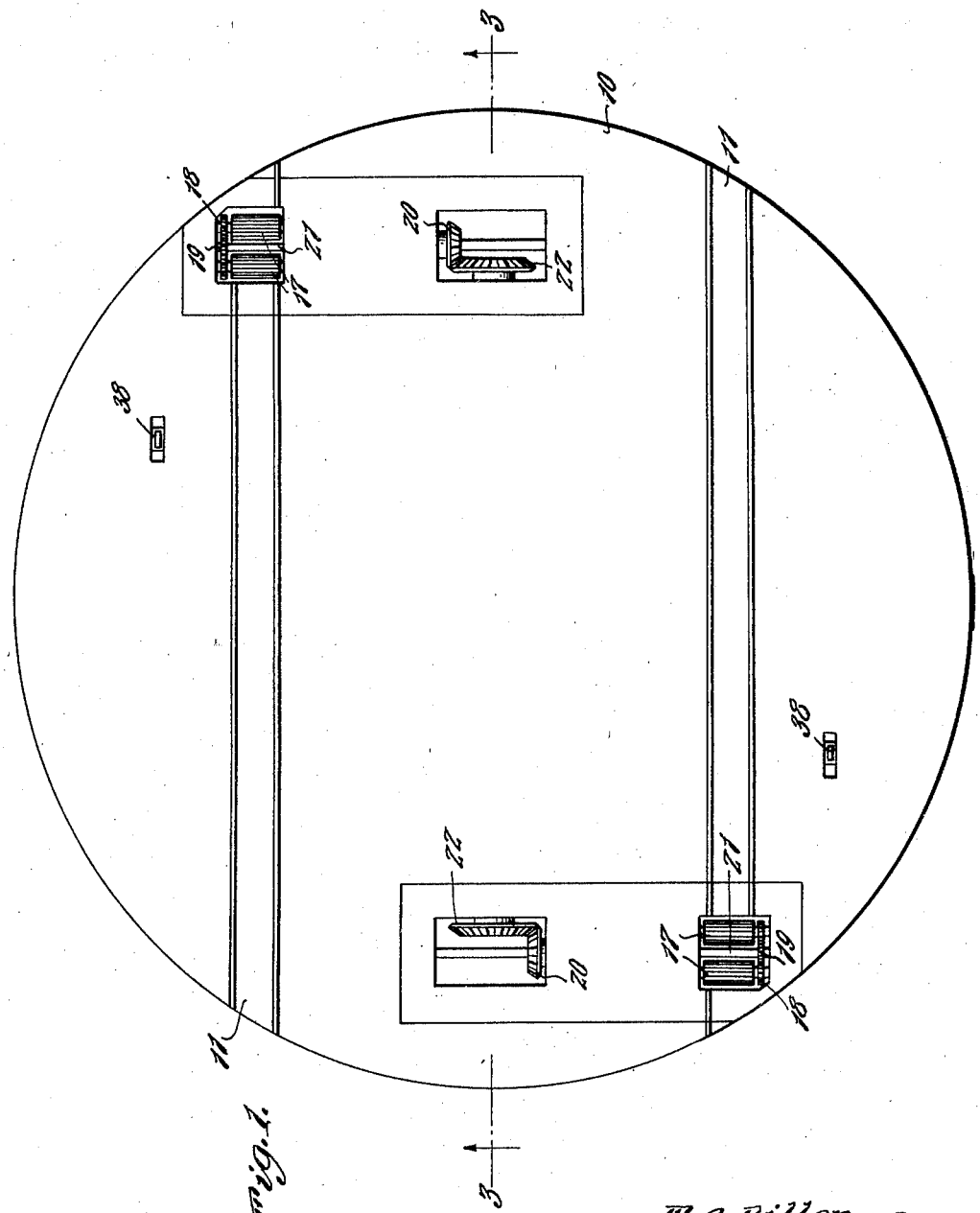
Figure 1 is a top plan view of the invention.
Figure 2:
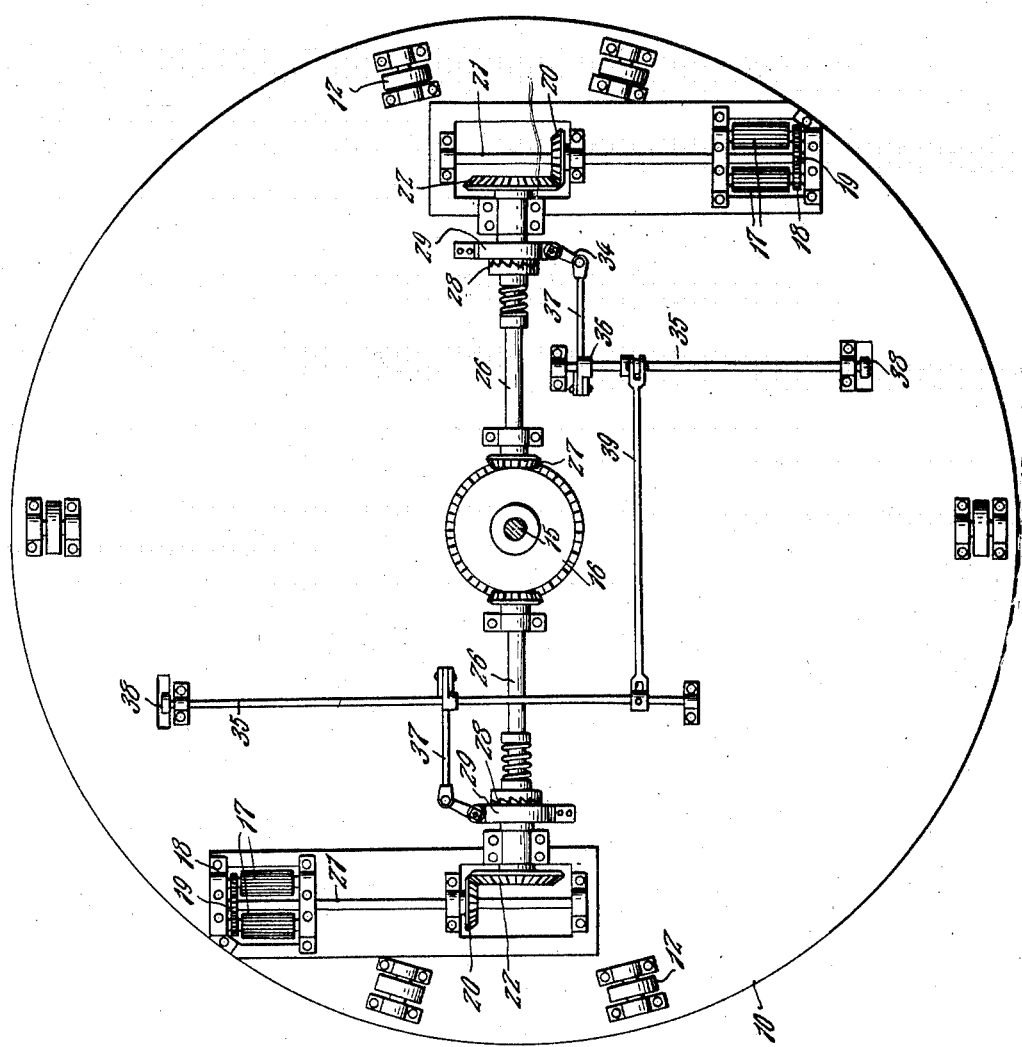
Figure 2 is a bottom plan view thereof.

Referring to the drawings in detail, wherein like characters of reference denote corresponding parts, the reference character 10 indicates a turn table preferably circular in contour.

Said table is provided with spaced channels 11 for guiding the wheels of the vehicle thereon for direct engagement with an operating mechanism to be presently described. Said table is adapted to be wholly positioned within a pit or other depression in the surface of a garage or place of storage and has provided upon its under side and at spaced intervals adjacent the marginal edges thereof roller members 12 adapted for circuitous movement upon an endless track 13 positioned within the bottom of said pit. An upstanding anchorage base 14 is disposed centrally within said pit and has fixed therein an upstanding vertically disposed shaft 15 which in turn has fixed or otherwise secured to the upper extremity thereof a ring gear 16. The upper surface of the turn table is disposed in the same plane with that of the garage floor.

Spaced roller members 17 are journaled within and upon said turn table at the entrance of each of the channels 11. Spur gears 18 are carried upon the ends of said roller members and adapted for meshing engagement with enlarged driven gears 19 which are cooperatively associated with pinions 20 carried upon the opposed ends of the shafts 21 affixed thereto. Relatively large bevel gears 22 carried upon the ends of sleeves 23 journaled upon the under side of the turn table are adapted for meshing engagement with the pinions 20 at angles approximately to that of 90°. Drums 25 are carried upon the opposed ends of said sleeves 23.

Shaft members 26 are provided and journaled upon the under side of the turn table and have their outer ends positioned within the bores of said sleeves while the inner and remaining extremities thereof are provided with pinions 27 meshing with the ring gear 16. Ratchet connections 28 are provided between each of the drums 25 and the respective shafts 26.

It is conceived from the foregoing description and accompanying drawings that the invention may be most effectively used in garages having inclined entrances; the invention permitting said vehicle to be turned completely around within the garage in order that said vehicle may be driven in preference to backing the same into a street and especially where traffic is heavy. In carrying out the invention it is to be noted that the wheels of the vehicle will be guided upon the turn table within the channels 11. The roller members 17 are disposed at the entrances of each of the said channels to support and engage the driving wheel of the vehicle, namely, the right rear wheel. When the driving wheel is in position upon said roller members said wheel is rotated in a forward direction thereby causing said gears 19 to rotate imparting like movement to the pinion 20 and in turn the pinion 27 meshing with the ring gear 16. Such operation will cause said turn table to rotate, using only one of the operating mechanisms, the other being free of binding action upon the ring gear 16 through the use and operation of the ratchet connection.

In order to provide means for checking the rotation of said turn table at a point more appropriate to driving the vehicle from the garage and free from cooperative movement with that of the turn table, I provide brake mechanisms including brake bands 29 suspended from the underside of the turn table and encircling appropriate portions and upon the outer surfaces of the drums 25. The ends of said bands terminate to provide spaced parallel apertured ears 30 through which the conventional form of spring pins 31 are passed. The heads of said bolts provide inclined outer surfaces 32 adapted to lie flush with cam nuts 33 carried by levers 34. Movement of the levers 34 in either direction will cause said bolts to be raised an appreciable distance, carrying the lowermost of the ears 30 therewith and tightening the bands upon the drums. Operating shafts 35 journaled upon the underside of the turn table 10 provide crank arms 36 operatively associated with the levers 34 through the instrumentality of links 37. Operating levers 38 are fixed upon the remaining extremities of the operating shafts 35 and protruding upwardly appreciable distances through the turn table at positions from which they may be most conveniently manipulated from the left front seat or driver's seat of the vehicle. A connecting rod 39 cooperatively associates the operating shafts 35 for simultaneous movement in order that movement of one of said operating levers 38 will cause both of said brake mechanisms to be effectively operated.

The operating levers 38 are so disposed upon the turn table as to permit the mechanism to be most effectively manipulated upon the return of the vehicle to the garage.

Although I have previously stated that the turn table may be wholly positioned within a pit, it is obviously understood that the turn table may be arranged upon the surface of the ground or any place where it is desired or necessary to change or otherwise reverse the position of a motor vehicle. When positioned upon the surface, the turn table will be provided with suitable ramps or means of approach to facilitate disposition of the vehicle upon the turn table.

The invention is susceptible of various changes in its form, proportions and minor details of construction, and the right is herein reserved to make such changes as properly fall within the scope of the appended claim.

Having thus described my invention, what is claimed is:

A turn table adapted for rotation within a pit therefor and disposing the upper surface thereof in alignment with that of a floor, guide channels disposed in spaced relation upon the upper surface of the turn table, operating mechanisms carried by the turn table and exposed in the entrances of each of said channels to operatively engage the driving wheels of a vehicle supported thereon, ratchet mechanism carried by each of said operating mechanisms for alternate operation, and brake mechanisms carried by the turn table effectively engaging said operating mechanisms for simultaneous engagement therewith to check the rotation of the turn table at either entrance.

In testimony whereof I affix my signature.

EARL A. DILLON